(12) United States Patent
Fung et al.

(10) Patent No.: US 8,314,186 B2
(45) Date of Patent: Nov. 20, 2012

(54) ADHESIVE COMPOSITION FOR USE IN BONDING OF POLARIZING PLATE

(75) Inventors: Dein-Run Fung, Taipei (TW); Sen-Huang Hsu, Taipei (TW); Hung-Hsun Wu, Taipei (TW); Huei-Jiun Juang, Taipei (TW)

(73) Assignee: Nan Ya Plastics Corporation, Taipei (TW)

( * ) Notice: Subject to any disclaimer, the term of this patent is extended or adjusted under 35 U.S.C. 154(b) by 267 days.

(21) Appl. No.: 12/884,324

(22) Filed: Sep. 17, 2010

(65) Prior Publication Data

US 2011/0086980 A1 Apr. 14, 2011

(51) Int. Cl.
*C08L 33/02* (2006.01)
(52) U.S. Cl. ............... 525/131; 525/118; 525/329.5; 525/329.7; 525/330.1
(58) Field of Classification Search .............. None
See application file for complete search history.

(56) References Cited

U.S. PATENT DOCUMENTS

| 5,330,796 A | * | 7/1994 | Kasari et al. ............ 427/407.1 |
| 2009/0270557 A1 | * | 10/2009 | Tomita et al. ............ 525/100 |

FOREIGN PATENT DOCUMENTS

JP 2-269780 A * 11/1990

* cited by examiner

*Primary Examiner* — Robert Sellers
(74) *Attorney, Agent, or Firm* — Bacon & Thomas, PLLC

(57) ABSTRACT

An adhesive composition for use in bonding of a polarizing plate is prepared from acrylic-based polymer graft-polymerized and modified by a reactive silane coupling agent with a specific grafting position and an ordinary cross-linking agent. Compared with unmodified acrylic-based copolymers, the adhesive composition thus synthesized demonstrates high adhesion property, cohesion property, elasticity property and high durability and, when used in bonding of the polarizing plate, flexibly follows dimensional changes of the polarizing plate in a high-temperature high-humidity atmosphere, alleviates the phenomenon where the polarizing plate demonstrates uneven distribution of residual stress due to dimensional changes of the polarizing plate, and prevents light leakage and uneven color which might otherwise occur to the polarizing plate due to the aging, cracking, or peeling of a conventional adhesive.

8 Claims, No Drawings

ADHESIVE COMPOSITION FOR USE IN BONDING OF POLARIZING PLATE

BACKGROUND OF THE PRESENT INVENTION

1. Field of the Present Invention

The present invention relates to adhesive compositions, and more particularly, to an adhesive composition for use in bonding of a polarizing plate.

2. Description of Prior Art

In recent years, as liquid crystal panels are becoming larger, the upper and lower surfaces of a polyvinyl alcohol (PVA) polarizing plate for use with liquid crystal components are bonded to a triacetate (TAC) protective film to form a three-layer structure. However, the polarizing plate usually operates in a high-temperature, high-humidity atmosphere which predisposes the polarizing plate to expansion and contraction in size, and thus an adhesive for use in bonding of the polarizing plate is susceptible to foaming, peeling, or light leakage.

To improve on the characteristics of the adhesive for use in bonding of the polarizing plate and prevent the adhesive in use in a high-temperature high-humidity atmosphere from foaming, peeling, or light leakage, problem-coping methods adopted are as follows:

1. The weight-average molecular weight of the adhesive is increased such that the weight-average molecular weight of the adhesive controllably ranges between 800,000 and 1,600,000, so as to increase the density of the cross-linking between the adhesive and a polarizing plate and improve the durability of the adhesive, as disclosed in US20090270557. However, increasing the weight-average molecular weight of an adhesive to above 1,200,000 not only increases the viscosity of the adhesive and results in uneven coating but also decreases adhesion. After being bonded to the polarizing plate, the adhesive is unfit to survive dimensional changes in a polarizing plate in a high-temperature high-humidity atmosphere, not to mention that the polarizing plate demonstrates uneven distribution of residual stress as a result of the adhesive thereon, and in consequence the polarizing plate readily comes off from a liquid crystal panel to thereby cause light leakage and other problems with durability.

Conversely, where the adhesive has a weight-average molecular weight of less than 1,000,000 and is bonded to a polarizing plate, the adhesive predisposes an adhesive layer of the polarizing plate to drawbacks arising from poor durability, such as foaming and peeling.

2. A high-molecule adhesive (with a weight-average molecular weight that ranges between 1,100,000 and 1,600,000) is mixed with a low-molecule adhesive (with a weight-average molecular weight that ranges between 30,000 and 50,000) to compensate for light leakage caused by low fluidity of the high-molecule adhesive, as disclosed in JP10-279907. However, the above disclosure in the prior art significantly widens the distribution of the overall molecular weight of the adhesive and thus fails to solve the problems with the durability of the adhesive.

3. A silane coupling agent is added to an adhesive so as to enhance wetting cohesion between the adhesive and an object coated therewith. In so doing, although the durability of the adhesive is slightly improved, the silane coupling agent is extrinsic to the adhesive and thereby does not directly react with acrylic-based copolymer. Also, the silane coupling agent used is greasy silicone of low surface tension and thus, given time, is readily separable from the adhesive and migrates to the surface of the adhesive. Despite the silane coupling agent used, the adhesive intended for use in bonding of a polarizing plate is not effective in bonding the polarizing plate and a liquid crystal panel, as disclosed in US20090270557, and thus fails to meet the demand for reliability of products.

SUMMARY OF THE INVENTION

In view of the aforesaid drawbacks of the prior art, it is an objective of the present invention to provide an adhesive composition for use in bonding of a polarizing plate, wherein a silane coupling agent is graft-polymerized onto two sides of an acrylic-based polymer to synthesize the acrylic-based polymer graft-polymerized and modified by the reactive silane coupling agent, and then the adhesive composition is prepared from the acrylic-based polymer thus synthesized and an ordinary cross-linking agent. Compared with unmodified acrylic-based copolymers, the adhesive composition thus synthesized enables the acrylic-based polymer to be readily disentangled and thus has advantages as follows:

1. Enhanced wetting cohesion between an adhesive and an object coated therewith; owing to strong affinity between the silane coupling agent and glass silicate molecules of the polarizing plate, the adhesive composition thus synthesized demonstrates high adhesion property and elasticity property and high durability, and the adhesive used in bonding of the polarizing plate flexibly follows dimensional changes of the polarizing plate in a high-temperature high-humidity atmosphere; and
2. Alleviation of the phenomenon where the polarizing plate demonstrates uneven distribution of residual stress due to dimensional changes of the polarizing plate. Accordingly, the adhesive composition of the present invention inhibits and solves the known problems with a polarizing plate, that is, light leakage, uneven color, and peeling.

Another objective of the present invention is to provide an adhesive composition for use in bonding of a polarizing plate such that the adhesive composition is prepared from 100 parts by weight of the acrylic-based polymer graft-polymerized and modified by a reactive silane coupling agent and 0.01 to 1 part by weight of a reactive cross-linking agent, wherein the weight-average molecular weight of the acrylic-based polymer ranges between 700,000 and 1,200,000 and, based to the total weight of the acrylic-based copolymer, the acrylic-based polymer is synthesized by polymerization of:

a. 50~98% of alkyl group-containing (meth)acrylic acid;

b. 1~10% of hydroxyl group-containing (meth)acrylic acid;

c. 0.1~5% of carboxyl group-containing (meth)acrylic acid; and d. 0.01~2% of reactive silane coupling agent

DETAILED DESCRIPTION OF THE PREFERRED EMBODIMENT

An adhesive composition of the present invention is prepared from a graft-polymerized modified acrylic-based polymer (A) and a cross-linking agent (B) and features excellent optical characteristics, enhanced durability, and enhanced light leakage prevention property.

The acrylic-based polymer (A) is graft-polymerized and modified by a reactive silane coupling agent and, according to the total weight of the acrylic-based copolymer, the acrylic-based polymer is synthesized by polymerization of constituents (monomers), wherein the constituents (monomers) are dissolved in a solvent selected from the group consisting of ethyl acetate, toluene, acetone, and butanone or dissolved in a mixed solvent comprising two or more selected from the group consisting of ethyl acetate, toluene, acetone, and butanone. The constituents (monomers) are as follows:

a. 50~98% of alkyl group-containing (meth)acrylic acid is one, or a mixture of at least two, selected from the group consisting of methyl (meth)acrylate, ethyl (meth)acrylate, propyl (meth)acrylate, butyl (meth)acrylate, isobutyl (meth)acrylate, 2-ethylhexyl (meth)acrylate, octyl (meth)acrylate, isooctyl (meth)acrylate, lauryl (meth)acrylate, octadecyl (meth)acrylate, cyclohexyl (meth)acrylate, methoxyethyl (meth)acrylate, and ethoxymethyl (meth)acrylate;

b. 1~10% of hydroxyl group-containing (meth)acrylic acid is one selected from the group consisting of 2-hydroxyethyl (meth)acrylate, 4-hydroxybutyl (meth)acrylate, chloro-2-hydroxypropyl acrylate, diethylene glycol mono(meth)acrylate, and allyl alcohol;

c. 0.1~5% of carboxyl group-containing (meth)acrylic acid is one selected from the group consisting of acrylic acid, methacrylic acid, itaconic acid, butenoic acid, maleic acid, fumaric acid, and maleic anhydride; and d. 0.01~2% of silane coupling agent, essentially comprising acrylate and ethylene, is one, or a mixture of at least two, selected from the group consisting of γ-methacryloxypropyltrimethoxysilane, vinyltrichlorosilane, vinyltrimethoxysilane, vinyltriethoxysilane, and ethylene-containing epoxy silane.

In addition to the aforesaid constituents, other monomers can be added to the acrylic-based polymer (A) for copolymerization thereof, provided that doing so does not jeopardize the scope of the present invention. For instance, monomers, such as vinyl acetate, phenylethene, methyl phenylethene, vinyl toluene and/or (meth)acrylonitrile, can be added to the acrylic-based polymer (A) during the polymerization process. The acrylic-based polymer (A) can be obtained by solution polymerization, emulsion polymerization, suspension polymerization, or block polymerization.

The weight-average molecular weight (Mw) of the acrylic-based polymer (A) ranges between 400,000 and 1,500,000, preferably between 600,000 and 1,200,000, and most preferably between 700,000 and 1,200,000. The weight-average molecular weight (Mw) is measured by GPC (gel permeation chromatography), using polystyrene as a standard for conversion.

The cross-linking agent (B) is one selected from the group consisting of isocyanate-based compound, epoxy compound, amine compound, metal-chelating compound, and aziridine compound, and is preferably isocyanate-based compound.

The isocyanate-based compound is one selected from the group consisting of isocyanate monomer, isocyanate compound, trimeric isocyanate, and biuret compound.

The isocyanate monomer is one selected from the group consisting of toluene diisocyanate, chlorob enzene diisocyanate, hexamethylene diisocyanate, tetramethylene diisocyanate, isophorone diisocyanate, xylylene diisocyanate, diphenylmethane diisocyanate, and hydrogenated diphenylmethane diisocyanate.

The isocyanate-based compound is manufactured by performing addition reaction on the isocyanate monomer and trimethylolpropane. For instance, an isocyanate-based cross-linking agent (supplied by Nan Ya Plastics Corporation and commercially known as CL isocyanate-based cross-linking agent).

The epoxy compound is one selected from the group consisting of diethyl glycidyl ether, polyethylene glycol diglycidyl ether, glycerol diglycidyl ether, glycerol triglycidyl ether, 1,3-bis(N,N-diglycidyl-aminomethyl)cyclohexane, N,N,N',N'-tetraglycidyl-m-xylene-diamine, N,N,N',N'-tetraglycidyl (aminophenyl)methane, triglycidyl triisocyanate, m-N,N-diglycidyl-aminophenyl glycidyl ether, N,N-diglycidyl-toluidine, and N,N-diglycidyl-aniline.

The amine compound is one selected from the group consisting of hexamethylenediamine, triethylenediamine, polyaziridine, hexamethylene tetraamine, diethylenetriamine, triethylenetetraamine, isophorone diamine, amine resin, and methylene group-containing resin.

The metal-chelating compound comprises one selected from the group consisting of aluminum, iron, copper, zinc, tin, titanium, nickel, antimony, magnesium, vanadium, chromium, and zirconium for forming a bond with acetylacetone or ethyl acetoacetate.

The aziridine compound is one selected from the group consisting of diphenylmethane-4,4-bis(1-aziridine formamide), 1,1,1-tris(hydroxymethyl)propane-β-aziridine propionate, tetra(hydroxymethyl)methane-β-aziridine propionate, toluene-2,4-bis(1-aziridine formamide), triethylene melamine, diisophthaloyl-1-(2-methylaziridine), and 1,1,1-tris(hydroxymethyl)prop ane-β-(2-methylaziridine) propionate.

The cross-linking agent (B) is usually in an amount of 0.01 to 1 part by weight, preferably 0.01 to 0.6 part by weight, and most preferably 0.05 to 0.5 party by weight, based on 100 parts by weight of the acrylic-based polymer (A). The adhesive composition of the present invention can be prepared by mixing and evenly stirring the acrylic-based polymer (A) and the cross-linking agent (B), provided that the ratio of the components and constituents falls within the disclosed synthesis formula.

However, if the amount of the cross-linking agent (B) used is excessive, the adhesive thus produced will have a relatively high bridging density and thus will become harder and more brittle; as a result, the adhesive composition thus synthesized fails to alleviate the phenomenon where the polarizing plate demonstrates uneven distribution of residual stress due to dimensional changes of the polarizing plate and fails to reduce or prevent the light leakage of the polarizing plate. Conversely, if the amount of the cross-linking agent (B) used is inadequate, the durability of the adhesive thus synthesized will be undesirably low.

The adhesive composition of the present invention is fit for use in bonding of a polarizing plate. Other additives, such as UV absorber, antioxidant, antiseptic, fungicide, thickening resin, plasticizer, defoaming agent, and wetting agent may be added to the adhesive composition of the present invention as needed, provided that doing so does not narrow down the scope of the present invention.

As regards the adhesive composition of the present invention, the acrylic-based polymer is graft-polymerized and modified by a reactive silane coupling agent with a specific grafting position to allow the acrylic-based polymer and the silane coupling agent to be bonded together. Owing to the low surface tension of the silane coupling agent, the acrylic-based polymer can be readily disentangled. Hence, the adhesive composition of the present invention has advantages as follows: enhanced wetting cohesion between the adhesive and an object coated therewith; owing to strong affinity between the silane coupling agent and glass silicate molecules of the polarizing plate, the adhesive composition thus synthesized demonstrates high adhesion property and elasticity property and high durability, and the adhesive used in bonding of the polarizing plate flexibly follows dimensional changes of the polarizing plate in a high-temperature high-humidity atmosphere; and alleviation of the phenomenon where the polarizing plate demonstrates uneven distribution of residual stress due to dimensional changes of the polarizing plate. Accordingly, the adhesive composition of the present invention inhibits and solves the known problems with a polarizing plate, that is, light leakage, uneven color, and peeling.

As regards a conventional adhesive composition, the silane coupling agent added to the acrylic-based polymer is extrinsic thereto, and thus the silane coupling agent and the acrylic-based polymer mingle together, and in consequence the silane coupling agent is not grafted onto the molecular structure of the acrylic-based polymer. Where the silane coupling agent accounts for an inadequate proportion of a conventional adhesive composition, bonding achieved is too weak to prevent the adhesive from coming off. Where the silane coupling agent accounts for an excessively large proportion of the conventional adhesive composition, given time, the silane coupling agent would be released from the acrylic-based polymer due to a difference in the surface tension between the silane coupling agent and the acrylic-based polymer, thereby resulting in undesirably low bonding durability of the conventional adhesive composition.

The elastic modulus E' of an adhesive layer for use with the adhesive composition of the present invention is evaluated by a rheometer. The higher the elastic modulus of the adhesive layer at a high temperature of 200° C. is, the greater the extent of the hardening of the adhesive layer of the polarizing plate is, and the greater the durability of the adhesive in a high-temperature high-humidity heat cycle atmosphere is, though at the cost of increased contraction, worsened heat-resistant dimensions stability, and deteriorated light leakage prevention property. Conversely, the lower the elastic modulus of the adhesive layer at a high temperature of 200° C. is, the softer the adhesive layer of the polarizing plate is, and the lower the durability of the adhesive is, but the better the light leakage prevention property is; however, the aforesaid results do not occur at another temperature, such as 150° C. Hence, optimal durability and light leakage prevention property are attained at 200° C. with the elastic modulus E' of $2.5 \times 10^5 \sim 5.5 \times 10^5$ dyne/cm$^2$ Embodiments Characteristics of the adhesive composition of the present invention are illustrated with some embodiments hereunder, but the scope of the present invention is not to be limited by the embodiments. The weight-average molecular weight (Mw) of polymers in the acrylic-based polymer solution is measured and calculated by GPC at the following measurement conditions.

Device: Shimadzu LC-10AT
Column: Guard column ±PLgel 10 μm Mixed-B+PLgel 5 μm Mixed-C+PLgel 5 μm Mixed-C
Sample Concentration: diluted to 1.5 mg/ml with tetrahydrofuran
Movement Phase Solvent: tetrahydrofuran
Rate of Flow: 1.0 ml/min
Temperature of Column: 35° C.

Preliminary Preparation of Acrylic-based Copolymer

<Sample 1>

Referring to Table 1, 89.97 parts by weight of butyl acrylate (n-BA), 5 parts by weight of 2-ethyl hexyl acrylate (2-EHA), 4 parts by weight of 2-hydroxyethyl acrylate (2-HEA), 1 part by weight of acrylic acid (AA), 100 parts by weight of a mixed solvent (ratio of ethyl acetate:toluene:acetone:butanone=20:30:25:25), and 0.03 part by weight of 2,2'-azobis-isobutyronitrile (AIBN) were put in a chemical reactor. Nitrogen gas was introduced into the chemical reactor to drive the air out of the chemical reactor. In the nitrogen atmosphere, the aforesaid chemicals were gently stirred, and the reacting solution was heated up to 66° C. to undergo reaction at a constant temperature of 66° C. for 8 hours. Then, 0.03 part by weight of a silane coupling agent A and 0.04 part by weight of the 2,2'-azobis-isobutyronitrile (AIBN) were put in the chemical reactor to undergo reaction for 4 hours. During the reaction, the reacting solution becoming too thick should be diluted with the mixed solvent. Upon completion of the reaction, the reacting solution was diluted with the mixed solvent until solid content accounts for 20% by weight of an acrylic-based polymer solution (Sample 1). The weight-average molecular weight (Mw) of the acrylic-based polymer thus obtained, as determined by GPC, is 700,000.

<Sample 2>

Referring to Table 1, 89.93 parts by weight of the butyl acrylate (n-BA), 5 parts by weight of 2-ethyl hexyl acrylate (2-EHA), 4 parts by weight of 2-hydroxyethyl acrylate (2-HEA), 1 part by weight of acrylic acid (AA), 100 parts by weight of a mixed solvent (ratio of ethyl acetate:toluene:acetone:butanone=20:30:25:25), and 0.03 part by weight of the 2,2'-azobis-isobutyronitrile (AIBN) were put in a chemical reactor. Nitrogen gas was introduced into the chemical reactor to drive the air out of the chemical reactor. In the nitrogen atmosphere, the aforesaid chemicals were gently stirred, and the reacting solution was heated up to 66° C. to undergo reaction at a constant temperature of 66° C. for 8 hours. Then, 0.07 part by weight of the silane coupling agent A and 0.04 part by weight of the 2,2'-azobis-isobutyronitrile (AIBN) were put in the chemical reactor to undergo reaction for 4 hours. During the reaction, the reacting solution becoming too thick should be diluted with the mixed solvent. Upon completion of the reaction, the reacting solution was diluted with the mixed solvent until solid content accounts for 20% by weight of an acrylic-based polymer solution (Sample 2). The weight-average molecular weight (Mw) of the acrylic-based polymer thus obtained, as determined by GPC, is 900,000.

<Sample 3>

Referring to Table 1, 89.90 parts by weight of the butyl acrylate (n-BA), 5 parts by weight of 2-ethyl hexyl acrylate (2-EHA), 4 parts by weight of 2-hydroxyethyl acrylate (2-HEA), 1 part by weight of acrylic acid (AA), 100 parts by weight of a mixed solvent (ratio of ethyl acetate:toluene:acetone:butanone=20:30:25:25), and 0.03 part by weight of the 2,2'-azobis-isobutyronitrile (AIBN) were put in a chemical reactor. Nitrogen gas was introduced into the chemical reactor to drive the air out of the chemical reactor. In the nitrogen atmosphere, the aforesaid chemicals were gently stirred, and the reacting solution was heated up to 66° C. to undergo reaction at a constant temperature of 66° C. for 10 hours. Then, 0.1 part by weight of the silane coupling agent A and 0.04 part by weight of the 2,2'-azobis-isobutyronitrile (AIBN) were put in the chemical reactor to undergo reaction for 4 hours. During the reaction, the reacting solution becoming too thick should be diluted with the mixed solvent. Upon completion of the reaction, the reacting solution was diluted with the mixed solvent until solid content accounts for 20% by weight of an acrylic-based polymer solution (Sample 3). The weight-average molecular weight (Mw) of the acrylic-based polymer thus obtained, as determined by GPC, is 1,100,000.

<Sample 4>

Referring to Table 1, 89.8 parts by weight of the butyl acrylate (n-BA), 5 parts by weight of 2-ethyl hexyl acrylate (2-EHA), 4 parts by weight of 2-hydroxyethyl acrylate (2-HEA), 1 part by weight of acrylic acid (AA), 100 parts by weight of a mixed solvent (ratio of ethyl acetate:toluene:acetone:butanone=20:30:25:25), and 0.03 part by weight of the 2,2'-azobis-isobutyronitrile (AIBN) were put in a chemical reactor. Nitrogen gas was introduced into the chemical reactor to drive the air out of the chemical reactor. In the nitrogen atmosphere, the aforesaid chemicals were gently stirred, and the reacting solution was heated up to 66° C. to undergo reaction at a constant temperature of 66° C. for 10 hours. Then, 0.2 part by weight of the silane coupling agent A and 0.04 part by weight of the 2,2'-azobis-isobutyronitrile (AIBN) were put in the chemical reactor to undergo reaction for 4 hours. During the reaction, the reacting solution becoming too thick should be diluted with the mixed solvent. Upon completion of the reaction, the reacting solution was diluted with the mixed solvent until solid content accounts for 20% by weight of an acrylic-based polymer solution (Sample 4). The weight-average molecular weight (Mw) of the acrylic-based polymer thus obtained, as determined by GPC, is 1,200,000.

<Sample 5>

The ratio of constituents in the synthesis formula for Sample 5 is the same as Sample 3, but there are changes in conditions of synthesis as follows: 0.07 part by weight of the silane coupling agent A is replaced with a silane coupling agent B; and the mixed solvent is ethyl acetate. Upon completion of the reaction, the reacting solution was diluted with ethyl acetate until solid content accounts for 20% by weight of an acrylic-based polymer solution (Sample 5). The weight-average molecular weight (Mw) of the acrylic-based polymer thus obtained, as determined by GPC, is 800,000.

<Sample 6>

The ratio of constituents in the synthesis formula is the same as Sample 3, but there are changes in conditions of synthesis as follows: 0.07 part by weight of the silane coupling agent A is replaced with a silane coupling agent C; and the mixed solvent is ethyl acetate. Upon completion of the reaction, the reacting solution was diluted with ethyl acetate until solid content accounts for 20% by weight of an acrylic-based polymer solution (Sample 6). The weight-average molecular weight (Mw) of the acrylic-based polymer thus obtained, as determined by GPC, is 1,100,000.

<Sample 7>

The ratio of constituents in the synthesis formula is the same as Sample 3, but there are changes in conditions of synthesis as follows: 0.07 part by weight of the silane coupling agent A is replaced with a silane coupling agent D; and the mixed solvent is ethyl acetate. Upon completion of the reaction, the reacting solution was diluted with ethyl acetate until solid content accounts for 20% by weight of an acrylic-based polymer solution (Sample 7). The weight-average molecular weight (Mw) of the acrylic-based polymer thus obtained, as determined by GPC, is 1,100,000.

<Sample 8>

Referring to Table 1, 89.92 parts by weight of the butyl acrylate (n-BA), 5 parts by weight of 2-ethyl hexyl acrylate (2-EHA), 4 parts by weight of 2-hydroxyethyl acrylate (2-HEA), 1 part by weight of acrylic acid (AA), 100 parts by weight of a mixed solvent (ratio of ethyl acetate:butanone=50:50), and 0.03 part by weight of the 2,2'-azobis-isobutyronitrile (AIBN) were put in a chemical reactor. Nitrogen gas was introduced into the chemical reactor to drive the air out of the chemical reactor. In the nitrogen atmosphere, the aforesaid chemicals were gently stirred, and the reacting solution was heated up to 66° C. to undergo reaction at a constant temperature of 66° C. for 10 hours. Then, 0.04 part by weight of the silane coupling agent A, the silane coupling agent B, and 0.04 part by weight of the 2,2'-azobis-isobutyronitrile (AIBN) were put in the chemical reactor to undergo reaction for 4 hours. During the reaction, the reacting solution becoming too thick should be diluted with the mixed solvent. Upon completion of the reaction, the reacting solution was diluted with the mixed solvent until solid content accounts for 20% by weight of an acrylic-based polymer solution (Sample 8). The weight-average molecular weight (Mw) of the acrylic-based polymer thus obtained, as determined by GPC, is 900,000.

<Sample 9>

Referring to Table 1, 89.91 parts by weight of the butyl acrylate (n-BA), 5 parts by weight of the 2-ethyl hexyl acrylate (2-EHA), 4 parts by weight of the 2-hydroxyethyl acrylate (2-HEA), 1 part by weight of the acrylic acid (AA), 100 parts by weight of the mixed solvent (ratio of ethyl acetate:butanone=50:50), and 0.03 part by weight of the 2,2'-azobis-isobutyronitrile (AIBN) were put in a chemical reactor. Nitrogen gas was introduced into the chemical reactor to drive the air out of the chemical reactor. In the nitrogen atmosphere, the aforesaid chemicals were gently stirred, and the reacting solution was heated up to 66° C. to undergo reaction at a constant temperature of 66° C. for 10 hours. Then, 0.03 part by weight of the silane coupling agent A, the silane coupling agent B, the silane coupling agent C, and 0.04 part by weight of the 2,2'-azobis-isobutyronitrile (AIBN) were put in the chemical reactor to undergo reaction for 4 hours. During the reaction, the reacting solution becoming too thick should be diluted with the mixed solvent. Upon completion of the reaction, the reacting solution was diluted with the mixed solvent until solid content accounts for 20% by weight of an acrylic-based polymer solution (Sample 9). The weight-average molecular weight (Mw) of the acrylic-based polymer thus obtained, as determined by GPC, is 1,000,000.

<Sample 10>

Referring to Table 1, 89.84 parts by weight of the butyl acrylate (n-BA), 5 parts by weight of the 2-ethyl hexyl acrylate (2-EHA), 4 parts by weight of the 2-hydroxyethyl acrylate (2-HEA), 1 part by weight of the acrylic acid (AA), 100 parts by weight of the mixed solvent (ratio of ethyl acetate:butanone=50:50), and 0.03 part by weight of the 2,2'-azobis-isobutyronitrile (AIBN) were put in a chemical reactor. Nitrogen gas was introduced into the chemical reactor to drive the air out of the chemical reactor. In the nitrogen atmosphere, the aforesaid chemicals were gently stirred, and the reacting solution was heated up to 66° C. to undergo reaction at a constant temperature of 66° C. for 10 hours. Then, 0.04 part by weight of the silane coupling agent A, the silane coupling agent B, the silane coupling agent C, the silane coupling agent D, and 0.04 part by weight of the 2,2'-azobis-isobutyronitrile (AIBN) were put in the chemical reactor to undergo reaction for 4 hours. During the reaction, the reacting solution becoming too thick should be diluted with the mixed solvent (ratio of ethyl acetate:butanone=50:50). Upon completion of the reaction, the reacting solution was diluted with the mixed solvent B until solid content accounts for 20% by weight of an acrylic-based polymer solution (Sample 10). The weight-average molecular weight (Mw) of the acrylic-based polymer thus obtained, as determined by GPC, is 1,200,000.

<Sample 11>

Referring to Table 1, 90 parts by weight of the butyl acrylate (n-BA), 5 parts by weight of the 2-ethyl hexyl acrylate (2-EHA), 4 parts by weight of the 2-hydroxyethyl acrylate (2-HEA), 1 part by weight of the acrylic acid (AA), 100 parts by weight of the mixed solvent (ratio of ethyl acetate:toluene:acetone:butanone=20:30:25:25), and 0.03 part by weight of the 2,2'-azobis-isobutyronitrile (AIBN) were put in a chemical reactor. Nitrogen gas was introduced into the chemical reactor to drive the air out of the chemical reactor. In the nitrogen atmosphere, the aforesaid chemicals were gently stirred, and the reacting solution was heated up to 66° C. to undergo reaction at a constant temperature of 66° C. for 8 hours. During the reaction, the reacting solution becoming too thick should be diluted with the mixed solvent. Upon completion of the reaction, the reacting solution was diluted with the mixed solvent until solid content accounts for 20% by weight of an acrylic-based polymer solution (Sample 11). The weight-average molecular weight (Mw) of the acrylic-based polymer thus obtained, as determined by GPC, is 1,100,000.

<Sample 12>

Referring to Table 1, 80 parts by weight of the butyl acrylate (n-BA), 5 parts by weight of the 2-ethyl hexyl acrylate (2-EHA), 4 parts by weight of the 2-hydroxyethyl acrylate (2-HEA), 5 parts by weight of benzyl acrylate (BZA), 5 parts by weight of 2-phenoxy ethyl acrylate (PHEA), 1 part by weight of the acrylic acid (AA), 100 parts by weight of the mixed solvent (ratio of ethyl acetate:toluene:acetone:butanone=20:30:25:25), and 0.05 part by weight of the 2,2'-azobis-isobutyronitrile (AIBN) were put in a chemical reactor. Nitrogen gas was introduced into the chemical reactor to drive the air out of the chemical reactor. In the nitrogen atmosphere, the aforesaid chemicals were gently stirred, and the reacting solution was heated up to 66° C. to undergo reaction at a constant temperature of 66° C. for 7 hours. Upon completion of the reaction, the reacting solution was diluted with the mixed solvent until solid content accounts for 20% by weight of an acrylic-based polymer solution (Sample 12). The weight-average molecular weight (Mw) of the acrylic-based polymer thus obtained, as determined by GPC, is 600,000.

<Sample 13>

Referring to Table 1, 80 parts by weight of the butyl acrylate (n-BA), 5 parts by weight of the 2-ethyl hexyl acrylate (2-EHA), 4 parts by weight of the 2-hydroxyethyl acrylate (2-HEA), 10 parts by weight of the benzyl acrylate (BZA), 1 part by weight of the acrylic acid (AA), 100 parts by weight of the mixed solvent (ratio of ethyl acetate:toluene:acetone:butanone=20:30:25:25), and 0.03 part by weight of the 2,2'-azobis-isobutyronitrile (AIBN) were put in a chemical reactor. Nitrogen gas was introduced into the chemical reactor to drive the air out of the chemical reactor. In the nitrogen atmosphere, the aforesaid chemicals were gently stirred, and the reacting solution was heated up to 66° C. to undergo reaction at a constant temperature of 66° C. for 10 hours. Upon completion of the reaction, the reacting solution was diluted with the mixed solvent until solid content accounts for 20% by weight of an acrylic-based polymer solution (Sample 13). The weight-average molecular weight (Mw) of the acrylic-based polymer thus obtained, as determined by GPC, is 850,000.

<Sample 14>

Referring to Table 1, 75 parts by weight of the butyl acrylate (n-BA), 5 parts by weight of the 2-ethyl hexyl acrylate (2-EHA), 4 parts by weight of the 2-hydroxyethyl acrylate (2-HEA), 15 parts by weight of the 2-phenoxy ethyl acrylate (PHEA), 1 part by weight of the acrylic acid (AA), 100 parts by weight of the mixed solvent (ratio of ethyl acetate:toluene:acetone:butanone=20:30:25:25), and 0.03 part by weight of the 2,2'-azobis-isobutyronitrile (AIBN) were put in a chemical reactor. Nitrogen gas was introduced into the chemical reactor to drive the air out of the chemical reactor. In the nitrogen atmosphere, the aforesaid chemicals were gently stirred, and the reacting solution was heated up to 66° C. to undergo reaction at a constant temperature of 66° C. for 10 hours. Upon completion of the reaction, the reacting solution was diluted with the mixed solvent until solid content accounts for 20% by weight of an acrylic-based polymer solution (Sample 14). The weight-average molecular weight (Mw) of the acrylic-based polymer thus obtained, as determined by GPC, is 1,100,000.

<Sample 15>

Referring to Table 1, 70 parts by weight of the butyl acrylate (n-BA), 5 parts by weight of the 2-ethyl hexyl acrylate (2-EHA), 4 parts by weight of the 2-hydroxyethyl acrylate (2-HEA), 20 parts by weight of the benzyl acrylate (BZA), 1 part by weight of the acrylic acid (AA), 100 parts by weight of the mixed solvent, and 0.025 part by weight of the 2,2'-azobis-isobutyronitrile (AIBN) were put in a chemical reactor. Nitrogen gas was introduced into the chemical reactor to drive the air out of the chemical reactor. In the nitrogen atmosphere, the aforesaid chemicals were gently stirred, and the reacting solution was heated up to 66° C. to undergo reaction at a constant temperature of 66° C. for 11 hours. Upon completion of the reaction, the reacting solution was diluted with the mixed solvent until solid content accounts for 20% by weight of an acrylic-based polymer solution (Sample 15). The weight-average molecular weight (Mw) of the acrylic-based polymer thus obtained, as determined by GPC, is 1,400,000.

<Sample 16>

Referring to Table 1, 60 parts by weight of the butyl acrylate (n-BA), 5 parts by weight of the 2-ethyl hexyl acrylate (2-EHA), 4 parts by weight of the 2-hydroxyethyl acrylate (2-HEA), 30 parts by weight of the benzyl acrylate (BZA), 1 part by weight of the acrylic acid (AA), 100 parts by weight of the mixed solvent, and 0.02 part by weight of the 2,2'-azobis-isobutyronitrile (AIBN) were put in a chemical reactor. Nitrogen gas was introduced into the chemical reactor to drive the air out of the chemical reactor. In the nitrogen atmosphere, the aforesaid chemicals were gently stirred, and the reacting solution was heated up to 66° C. to undergo reaction at a constant temperature of 66° C. for 12 hours. Upon completion of the reaction, the reacting solution was diluted with the mixed solvent until solid content accounts for 20% by weight of an acrylic-based polymer solution (Sample 16). The weight-average molecular weight (Mw) of the acrylic-based polymer thus obtained, as determined by GPC, is 1,600,000.

<Sample 17>

Referring to Table 1, 90 parts by weight of the butyl acrylate (n-BA), 5 parts by weight of the 2-ethyl hexyl acrylate (2-EHA), 4 parts by weight of the 2-hydroxyethyl acrylate (2-HEA), 1 part by weight of the acrylic acid (AA), 100 parts by weight of toluene, and 2.5 parts by weight of the 2,2'-azobis-isobutyronitrile (AIBN) were put in a chemical reactor. Nitrogen gas was introduced into the chemical reactor to drive the air out of the chemical reactor. In the nitrogen atmosphere, the aforesaid chemicals were gently stirred, and the reacting solution was heated up to 100° C. to undergo reaction at a constant temperature of 100° C. for 7 hours. Upon completion of the reaction, the reacting solution was diluted with toluene until solid content accounts for 20% by weight of an acrylic-based polymer solution (Sample 17). The weight-average molecular weight (Mw) of the acrylic-based polymer thus obtained, as determined by GPC, is 30,000.

Disclosed in the embodiments and comparative examples is a 38 μm polyester release film (supplied by Nan Ya Plastics Corporation) whereby an adhesive composition prepared is bonded to the polarizing plate, and the quality specifications of the 38 μm polyester release film are as follows:

| Item | Quality specifications of 38 μm polyester release film |
|---|---|
| appearance | no bright spots |
| light transmittance | over 90% |
| release force (g/25 mm) | 8 ± 2 |
| surface roughness | under 0.5μ |
| residual adhesion rate | over 92% |

The optical members in the embodiments and comparative examples were evaluated in terms of "tolerance to high temperature and durability", "high-temperature, high-humidity heat cycle durability", "light leakage prevention property", and "rheometer elastic modulus" by respective methods described hereunder.

1. Evaluation Method for Tolerance to High Temperature and Durability

The optical members in Embodiments 1 to 10 and Comparative Examples 1 to 9 were respectively cut into a size of 10 cm×10 cm, bonded to one surface of a non-alkali glass plate using a laminator roll and then held for 20 minutes in an autoclave adjusted to 50° C. and 5 atm, to prepare a test plate.

Two test plates similar to that described above were prepared, and then they were allowed to stand under the conditions of a temperature of 60° C. and a humidity of 95% RH for 500 hours and under the conditions of a temperature of 85° C. for 500 hours, respectively. They were visually observed on occurrence of foaming, peeling, cracking and the like and evaluated by the following criteria.

"Excellent" represents the test plates do not manifest bad appearance, such as foaming, peeling, or cracking at all.

"Good" represents the test plates manifest bad appearance, such as foaming, peeling, or cracking, slightly.

"Poor" represents the test plates manifest bad appearance, such as foaming, peeling, or cracking, locally and mildly.

"Bad" represents the test plates manifest bad appearance, such as foaming, peeling, or cracking, noticeably.

2. Evaluation Method for High-temperature, High-humidity Heat Cycle Durability

The optical member was bonded to one surface of a non-alkali glass plate using a laminator roll and then held for 20 minutes in an autoclave adjusted to 50° C. and 5 atm, to prepare a test plate. Heat cycle (one cycle: −40° C. for 30 minutes and 80° C. for 30 minutes) of the test plate thus prepared was repeated 200 times using a thermal impact device THS-C4T-100 manufactured by KSON Corp. Then, the optical member was visually observed on occurrence of foaming, lifting and peeling and evaluated by the following criteria.

"Excellent" represents the test plates do not manifest bad appearance, such as foaming, lifting, or peeling at all "Good" represents the test plates manifest bad appearance, such as foaming, lifting, or peeling, slightly "Poor" represents the test plates manifest bad appearance, such as foaming, lifting, or peeling, locally and mildly "Bad" represents the test plates manifest bad appearance, such as foaming, lifting, or peeling, noticeably 3. Evaluation Method for Light Leakage Prevention Property Using a laminator roll, two of the optical members were bonded to a back surface of a non-alkali glass plate, respectively, so as to become in a state of crossed Nicols, and then, they were held for 20 minutes in an autoclave adjusted to 50° C. and 5 atm, to prepare a test plate.

The test plate thus prepared was allowed to stand for 72 hours under the conditions of 65° C., and the test plate was visually observed on light leakage prevention property and evaluated by the following criteria.

"Excellent" represents the test plates do not manifest light leakage phenomenon at all.

"Good" represents the test plates rarely manifest light leakage phenomenon.

"Poor" represents the test plates manifest light leakage phenomenon slightly.

"Bad" represents the test plates manifest light leakage phenomenon noticeably.

4. Evaluation Method for Rheometer Elastic Modulus

The solution of an adhesive composition was applied to a surface of a polyester film having been subjected to release treatment and is 38 μm thick, and then dried to obtain an adhesive sheet having an adhesive layer of 1 mm thickness. The adhesive sheet was aged for 7 days under the conditions of a temperature of 23° C. and a humidity of 65% RH to obtain an optical film from which a test plate of a size of 5 mm×12.5 mm was extracted and placed in Waters RSA-3 dynamic mechanical analyzer (manufactured by the US-based Waters Corporation) to undergo -1001 frequency scanning at 4° C. to 200° C., and then its viscosity-elasticity curve was plotted. The value E' at 150° C. and 200° C. was calculated by the curve of the elastic modulus.

EXAMPLE 1

The solid content of the Sample 1 acrylic-based polymer solution shown in Table 1 was treated as 100 parts by weight and then mixed with 0.2 part by weight of an isocyanate-based cross-linking agent (supplied by Nan Ya Plastics Corporation and is commercially known as CL isocyanate-based cross-linking agent). The mixture was stirred thoroughly, so as to prepare a solution of an adhesive composition in this Embodiment.

The solution of an adhesive composition was applied to a surface of a polyester film having been subjected to release treatment and is 38 μm thick, and then dried to obtain an adhesive sheet having an adhesive layer of 25 μm thickness. The adhesive sheet was bonded to one surface of a polarizing film and aged for 7 days under the conditions of 23° C. and a humidity of 65% RH to thereby obtain an optical member.

The optical member thus obtained was evaluated in terms of "tolerance to high temperature and durability", "high-temperature, high-humidity heat cycle durability", "light leakage prevention property", and "rheometer elastic modulus", and the results of the evaluation are shown in Table 2.

EXAMPLE 2

The solid content of the Sample 2 acrylic-based polymer solution shown in Table 1 was treated as 100 parts by weight and then mixed with 0.2 part by weight of an isocyanate-based cross-linking agent mentioned in Embodiment 1. The mixture was stirred thoroughly, so as to prepare an adhesive composition solution.

As with the process step of Embodiment 1, the optical member thus obtained was evaluated in terms of "tolerance to high temperature and durability", "high-temperature, high-humidity heat cycle durability", "light leakage prevention property", and "rheometer elastic modulus", and the results of the evaluation are shown in Table 2.

EXAMPLE 3

The solid content of the Sample 3 acrylic-based polymer solution shown in Table 1 was treated as 100 parts by weight and then mixed with 0.2 part by weight of an isocyanate-based cross-linking agent illustrated in Embodiment 1. The mixture was stirred thoroughly, so as to prepare a solution of an adhesive composition.

As with the process step of Embodiment 1, the optical member thus obtained was evaluated in terms of "tolerance to high temperature and durability", "high-temperature, high-humidity heat cycle durability", "light leakage prevention property", and "rheometer elastic modulus", and the results of the evaluation are shown in Table 2.

EXAMPLE 4

The solid content of the Sample 4 acrylic-based polymer solution shown in Table 1 was treated as 100 parts by weight and then mixed with 0.2 part by weight of an isocyanate-based cross-linking agent illustrated in Embodiment 1. The mixture was stirred thoroughly, so as to prepare a solution of an adhesive composition.

As with the process step of Embodiment 1, the optical member thus obtained was evaluated in terms of "tolerance to high temperature and durability", "high-temperature high-humidity heat cycle durability", "light leakage prevention property", and "rheometer elastic modulus", and the results of the evaluation are shown in Table 2.

EXAMPLE 5

The solid content of the Sample 5 acrylic-based polymer solution shown in Table 1 was treated as 100 parts by weight and then mixed with 0.2 part by weight of an isocyanate-based cross-linking agent illustrated in Embodiment 1. The mixture was stirred thoroughly, so as to prepare a solution of an adhesive composition.

As with the process step of Embodiment 1, the optical member thus obtained was evaluated in terms of "tolerance to high temperature and durability", "high-temperature, high-humidity heat cycle durability", "light leakage prevention property", and "rheometer elastic modulus", and the results of the evaluation are shown in Table 2.

EXAMPLE 6

The solid content of the Sample 6 acrylic-based polymer solution shown in Table 1 was treated as 100 parts by weight and then mixed with 0.2 part by weight of an isocyanate-based cross-linking agent illustrated in Embodiment 1. The mixture was stirred thoroughly, so as to prepare a solution of an adhesive composition.

As with the process step of Embodiment 1, the optical member thus obtained was evaluated in terms of "tolerance to high temperature and durability", "high-temperature, high-humidity heat cycle durability", "light leakage prevention property", and "rheometer elastic modulus", and the results of the evaluation are shown in Table 2.

EXAMPLE 7

The solid content of the Sample 7 acrylic-based polymer solution shown in Table 1 was treated as 100 parts by weight and then mixed with 0.2 part by weight of an isocyanate-based cross-linking agent illustrated in Embodiment 1. The mixture was stirred thoroughly, so as to prepare a solution of an adhesive composition.

As with the process step of Embodiment 1, the optical member thus obtained was evaluated in terms of "tolerance to high temperature and durability", "high-temperature, high-humidity heat cycle durability", "light leakage prevention property", and "rheometer elastic modulus", and the results of the evaluation are shown in Table 2.

EXAMPLE 8

The solid content of the Sample 8 acrylic-based polymer solution shown in Table 1 was treated as 100 parts by weight and then mixed with 0.2 part by weight of an isocyanate-based cross-linking agent illustrated in Embodiment 1. The mixture was stirred thoroughly, so as to prepare a solution of an adhesive composition.

As with the process step of Embodiment 1, the optical member thus obtained was evaluated in terms of "tolerance to high temperature and durability", "high-temperature, high-humidity heat cycle durability", "light leakage prevention property", and "rheometer elastic modulus", and the results of the evaluation are shown in Table 2.

EXAMPLE 9

The solid content of the Sample 9 acrylic-based polymer solution shown in Table 1 was treated as 100 parts by weight and then mixed with 0.2 part by weight of an isocyanate-based cross-linking agent illustrated in Embodiment 1. The mixture was stirred thoroughly, so as to prepare a solution of an adhesive composition.

As with the process step of Embodiment 1, the optical member thus obtained was evaluated in terms of "tolerance to high temperature and durability", "high-temperature, high-humidity heat cycle durability", "light leakage prevention property", and "rheometer elastic modulus", and the results of the evaluation are shown in Table 2.

EXAMPLE 10

The solid content of the Sample 10 acrylic-based polymer solution shown in Table 1 was treated as 100 parts by weight and then mixed with 0.2 part by weight of an isocyanate-based cross-linking agent illustrated in Embodiment 1. The mixture was stirred thoroughly, so as to prepare a solution of an adhesive composition.

As with the process step of Embodiment 1, the optical member thus obtained was evaluated in terms of "tolerance to high temperature and durability", "high-temperature, high-humidity heat cycle durability", "light leakage prevention property", and "rheometer elastic modulus", and the results of the evaluation are shown in Table 2.

COMPARATIVE EXAMPLE 1

The solid content of the Sample 11 acrylic-based polymer solution shown in Table 1 was treated as 100 parts by weight and then mixed with 0.2 part by weight of an isocyanate-based cross-linking agent illustrated in Embodiment 1. The mixture was stirred thoroughly, so as to prepare a solution of an adhesive composition.

As with the process step of Embodiment 1, the optical member thus obtained was evaluated in terms of "tolerance to high temperature and durability", "high-temperature, high-humidity heat cycle durability", "light leakage prevention property", and "rheometer elastic modulus", and the results of the evaluation are shown in Table 2.

COMPARATIVE EXAMPLE 2

The solid content of the Sample 12 acrylic-based polymer solution shown in Table 1 was treated as 100 parts by weight and then mixed with 0.2 part by weight of an isocyanate-based cross-linking agent illustrated in Embodiment 1. The mixture was stirred thoroughly, so as to prepare a solution of an adhesive composition.

As with the process step of Embodiment 1, the optical member thus obtained was evaluated in terms of "tolerance to high temperature and durability", "high-temperature, high-humidity heat cycle durability", "light leakage prevention property", and "rheometer elastic modulus", and the results of the evaluation are shown in Table 2.

COMPARATIVE EXAMPLE 3

The solid content of the Sample 13 acrylic-based polymer solution shown in Table 1 was treated as 100 parts by weight and then mixed with 0.2 part by weight of an isocyanate-based cross-linking agent illustrated in Embodiment 1 and 0.1 part by weight of a silane coupling agent. The mixture was stirred thoroughly, so as to prepare a solution of an adhesive composition.

As with the process step of Embodiment 1, the optical member thus obtained was evaluated in terms of "tolerance to high temperature and durability", "high-temperature, high-humidity heat cycle durability", "light leakage prevention property", and "rheometer elastic modulus", and the results of the evaluation are shown in Table 2.

COMPARATIVE EXAMPLE 4

The solid content of the Sample 14 acrylic-based polymer solution shown in Table 1 was treated as 100 parts by weight and then mixed with 0.2 part by weight of an isocyanate-based cross-linking agent illustrated in Embodiment 1 and 0.1 part by weight of the silane coupling agent. The mixture was stirred thoroughly, so as to prepare a solution of an adhesive composition.

As with the process step of Embodiment 1, the optical member thus obtained was evaluated in terms of "tolerance to high temperature and durability", "high-temperature, high-humidity heat cycle durability", "light leakage prevention property", and "rheometer elastic modulus", and the results of the evaluation are shown in Table 2.

COMPARATIVE EXAMPLE 5

The solid content of the Sample 15 acrylic-based polymer solution shown in Table 1 was treated as 100 parts by weight and then mixed with 0.2 part by weight of an isocyanate-based cross-linking agent illustrated in Embodiment 1 and 0.1 part by weight of the silane coupling agent. The mixture was stirred thoroughly, so as to prepare a solution of an adhesive composition.

As with the process step of Embodiment 1, the optical member thus obtained was evaluated in terms of "tolerance to high temperature and durability", "high-temperature, high-humidity heat cycle durability", "light leakage prevention property", and "rheometer elastic modulus", and the results of the evaluation are shown in Table 2.

COMPARATIVE EXAMPLE 6

The solid content of the Sample 15 acrylic-based polymer solution shown in Table 1 was treated as 100 parts by weight and then mixed with 0.2 part by weight of an isocyanate-based cross-linking agent illustrated in Embodiment 1 and 0.2 part by weight of the silane coupling agent. The mixture was stirred thoroughly, so as to prepare a solution of an adhesive composition.

As with the process step of Embodiment 1, the optical member thus obtained was evaluated in terms of "tolerance to high temperature and durability", "high-temperature, high-humidity heat cycle durability", "light leakage prevention property", and "rheometer elastic modulus", and the results of the evaluation are shown in Table 2.

COMPARATIVE EXAMPLE 7

The solid content of the Sample 16 acrylic-based polymer solution shown in Table 1 was treated as 100 parts by weight and then mixed with 0.2 part by weight of an isocyanate-based cross-linking agent illustrated in Embodiment 1 and 0.3 part by weight of the silane coupling agent. The mixture was stirred thoroughly, so as to prepare a solution of an adhesive composition.

As with the process step of Embodiment 1, the optical member thus obtained was evaluated in terms of "tolerance to high temperature and durability", "high-temperature, high-humidity heat cycle durability", "light leakage prevention property", and "rheometer elastic modulus", and the results of the evaluation are shown in Table 2.

COMPARATIVE EXAMPLE 8

The solid content of the Sample 17 acrylic-based polymer solution shown in Table 1 was treated as 100 parts by weight and then mixed with 0.2 part by weight of an isocyanate-based cross-linking agent illustrated in Embodiment 1 and 0.1 part by weight of the silane coupling agent. The mixture was stirred thoroughly, so as to prepare a solution of an adhesive composition.

As with the process step of Embodiment 1, the optical member thus obtained was evaluated in terms of "tolerance to high temperature and durability", "high-temperature, high-humidity heat cycle durability", "light leakage prevention property", and "rheometer elastic modulus", and the results of the evaluation are shown in Table 2.

COMPARATIVE EXAMPLE 9

The solid content of the Sample 14 acrylic-based polymer solution shown in Table 1 was treated as 70 parts by weight, and the solid content of the Sample 17 acrylic-based polymer solution shown in Table 1 was treated as 30 parts by weight. Then, the aforesaid solid content of the Samples 14 and 17 was mixed with 0.2 part by weight of an isocyanate-based cross-linking agent illustrated in Embodiment 1 and 0.1 part by weight of the silane coupling agent. The mixture was stirred thoroughly, so as to prepare a solution of an adhesive composition.

As with the process step of Embodiment 1, the optical member thus obtained was evaluated in terms of "tolerance to high temperature and durability", "high-temperature, high-humidity heat cycle durability", "light leakage prevention property", and "rheometer elastic modulus", and the results of the evaluation are shown in Table 2.

Results of Evaluation

1. As shown in Table 1 and Table 2, regarding preparation of an adhesive composition in Examples 1-4, an acrylic-based polymer was graft-polymerized and modified with different amounts of a reactive silane coupling agent. Although the amount of the reactive silane coupling agent used was extremely small, the adhesive composition prepared under strict conditions demonstrated excellent durability (including "tolerance to high temperature" and "high-temperature, high-humidity heat cycle durability") and light leakage prevention property.

2. In Examples 5-7, the acrylic-based polymer was graft-polymerized and modified with different types of the reactive silane coupling agent. The adhesive composition thus prepared passed the durability tests of "tolerance to high temperature" and "high-temperature, high-humidity heat cycle durability", but the use of different types of the silane coupling agent slightly deteriorated a portion of the light leakage prevention property.

3. In Examples 8-10, the acrylic-based polymer was graft-polymerized and modified with a mixture of at least two types of the reactive silane coupling agent. The adhesive composition thus prepared passed the durability tests of "tolerance to high temperature" and "high-temperature, high-humidity heat cycle durability".

4. In Comparative Example 1, the acrylic-based polymer not graft-polymerized and modified with the reactive silane coupling agent was used. The adhesive composition thus prepared under strict conditions failed the durability tests ("tolerance to high temperature" and "high-temperature, high-humidity heat cycle durability") and was poor in light leakage prevention.

5. In Comparative Examples 2 and 3, 10 parts by weight of an aromatic ring-containing monomer was added. In Comparative Example 4, 15 parts by weight of an aromatic ring-containing monomer was added in order to synthesize the acrylic-based polymer. In Comparative Examples 3 and 4, a silane coupling agent was extrinsically added, which was intended to achieve a mingling purpose. Hence, in Comparative Examples 2-4, the acrylic-based polymer was not graft-polymerized and modified with the reactive silane coupling agent.

Upon evaluation, it was found that the adhesive composition prepared in Embodiments 1-10 excelled the adhesive composition prepared in Comparative Examples 2-4 in durability.

6. In Comparative Example 5, 20 parts by weight of an aromatic ring-containing monomer was added in order to synthesize the acrylic-based polymer. In Comparative Examples 5 and 6, the amount of the silane coupling agent set forth in a processing formula was increased twofold to thereby enhance "tolerance to high temperature" and "high-temperature, high-humidity heat cycle durability", but the light leakage prevention property remained unimproved.

Upon evaluation, it was found that the adhesive composition prepared in Embodiments 1-10 excelled the adhesive composition prepared in Comparative Examples 5 and 6 in the light leakage prevention property.

7. In Comparative Example 7, 30 parts by weight of an aromatic ring-containing monomer was added in order to synthesize the acrylic-based polymer, and the amount of the silane coupling agent set forth in a processing formula was increased threefold to thereby enhance "tolerance to high temperature" and "high-temperature, high-humidity heat cycle durability", but the light leakage prevention property remained unimproved.

Upon evaluation, it was found that the adhesive composition prepared in Embodiments 1-10 excelled the adhesive composition prepared in Comparative Example 7 in the light leakage prevention property.

8. In Comparative Example 8, Sample 17 acrylic-based polymer solution shown in Table 1 had a molecular weight of 30,000 which was too low to allow the acrylic-based polymer thus synthesized to demonstrate sufficient physical properties; an adhesive composition prepared from the acrylic-based polymer was poor in "tolerance to high temperature" and "high-temperature, high-humidity heat cycle durability" and failed the durability tests.

9. In Comparative Example 9, 70 parts by weight of acrylic-based polymer from Sample 14 shown in Table 1 was mingled with 30 parts by weight of the acrylic-based polymer from Sample 17 shown in Table 1, and then the cross-linking agent and the silane coupling agent are extrinsically added to the mixture of the acrylic-based polymer from Sample 14 and Sample 17 so as to prepare an adhesive composition.

Upon evaluation, it was found that although the adhesive composition prepared in Comparative Example 9 demonstrated improvement in its light leakage prevention property, the adhesive composition prepared in Embodiments 2-10 excelled the adhesive composition prepared in Comparative Example 9 in "tolerance to high temperature" and "high-temperature, high-humidity heat cycle durability".

10. Referring to Table 2, in Embodiment 1, an adhesive that does not comprise the acrylic-based polymer graft-polymerized and modified by an ethylene/silane coupling agent with a reactive functional group was poor in high-temperature high-humidity heat cycle durability, and thus its elastic modulus (storage modulus) E' at the high-temperature region (200° C.) of an analytic curve plotted by a dynamic mechanical analyzer was $3.53 \times 10^5$ dyne/cm$^2$.

In Example 2, an adhesive that comprises the acrylic-based polymer graft-polymerized and modified by a 0.07% ethylene/silane coupling agent with a reactive functional group demonstrated enhanced durability, and thus its elastic modulus E' at the high-temperature region (200° C.) of an analytic curve plotted by a dynamic mechanical analyzer was increased to $5.82 \times 10^5$ dyne/cm$^2$.

An adhesive that comprises the acrylic-based polymer graft-polymerized and modified by a 0.1% ethylene/silane coupling agent with a reactive functional group in Embodiment 3 and the acrylic-based polymer graft-polymerized and modified by a 0.2% ethylene/silane coupling agent with a reactive functional group in Embodiment 4 demonstrated enhanced durability, and thus its elastic modulus E' at the high-temperature region of an analytic curve plotted by a dynamic mechanical analyzer was $6.8 \times 10^5$ and $8.4 \times 10^5$ dyne/cm$^2$, respectively, to thereby bring its "tolerance to high temperature" and "high-temperature, high-humidity heat cycle durability" into full play.

In Example 5, an adhesive that comprises the acrylic-based polymer graft-polymerized and modified by a 0.07% ethylene/silane coupling agent with a reactive functional group demonstrated enhanced durability, and thus its elastic modulus E' at the high-temperature region (200° C.) of an analytic curve plotted by a dynamic mechanical analyzer was $6.67 \times 10^5$ dyne/cm$^2$, thereby bringing its "tolerance to high temperature" and "high-temperature, high-humidity heat cycle durability" into full play.

11. Referring to Table 2, in Example 6, an adhesive that comprises the acrylic-based polymer graft-polymerized and modified by a 0.07% ethylene/silane coupling agent with a reactive functional group demonstrated enhanced durability. Its elastic modulus E' at the high-temperature region (200° C.) of an analytic curve plotted by a dynamic mechanical analyzer was $7.22 \times 10^5$ dyne/cm$^2$, thereby bringing its "tolerance to high temperature" and "high-temperature, high-humidity heat cycle durability" into full play.

12. Referring to Table 2, in Example 7, an adhesive that comprises the acrylic-based polymer graft-polymerized and modified by a 0.07% ethylene/silane coupling agent with a reactive functional group demonstrated enhanced durability.

Its elastic modulus E' at the high-temperature region (200° C.) of an analytic curve plotted by a dynamic mechanical analyzer was $5.08 \times 10^5$ dyne/cm², thereby bringing its "tolerance to high temperature" and "high-temperature, high-humidity heat cycle durability" into full play.

13. Referring to Table 2, in Example 8, Example 9, and Example 10, an adhesive that comprises the acrylic-based polymer graft-polymerized and modified by a 0.08% to 0.16% of different types of the ethylene/silane coupling agent with a reactive functional group. Its elastic modulus E' at the high-temperature region (200° C.) of an analytic curve plotted by a dynamic mechanical analyzer was $5.7 \times 10^5$ dyne/cm² to $2.73 \times 10^5$ dyne/cm². Its "tolerance to high temperature" and "high-temperature high-humidity heat cycle durability" are brought into full place.

14. Referring to Table 2, in Comparative Example 1, an adhesive was prepared without an ethylene/silane coupling agent, and thus its elastic modulus E' at the high-temperature region (200° C.) of an analytic curve plotted by a dynamic mechanical analyzer was $0.86 \times 10^5$ dyne/cm². In Comparative Example 2 and Comparative Example 3, 10% benzene ring monomer was used. In Comparative Example 4, 15% benzene ring monomer was used. In Comparative Example 5, 20% benzene ring monomer was used. Hence, as regards an adhesive comprising the acrylic-based polymer thus synthesized in Comparative Examples 2-5, its elastic modulus E' at the high-temperature region of an analytic curve plotted by a dynamic mechanical analyzer was less than $2.23 \times 10^5$ dyne/cm², indicating that its durability and light leakage prevention property were undesirably poor.

15. Referring to Table 2, elastic modulus E', at the high-temperature region (200° C.) of an analytic curve plotted by a dynamic mechanical analyzer, of an adhesive comprising the acrylic-based polymer synthesized by using 20% benzene ring monomer in Comparative Example 6 and the acrylic-based polymer synthesized by using 30% benzene ring monomer in Comparative Example 7 was $2.07 \times 10^5$ dyne/cm² and $1.39 \times 10^5$ dyne/cm², respectively, indicating noticeably poor "tolerance to high temperature" and "high-temperature high-humidity heat cycle durability" of the adhesive.

In Comparative Example 8, an adhesive prepared without an ethylene/silane coupling agent had a molecular weight of 30,000 which was too low to allow the acrylic-based polymer thus synthesized to demonstrate sufficient physical properties. Its "tolerance to high temperature" and "high-temperature high-humidity heat cycle durability" were undesirably poor. Hence, its elastic modulus E', at the high-temperature region (200° C.) of an analytic curve plotted by a dynamic mechanical analyzer, was only $0.79 \times 10^5$ dyne/cm².

In Comparative Example 9, an adhesive composition solution was prepared by mingling an acrylic-based polymer of a high molecular weight and an acrylic-based polymer of a low molecular weight. Its elastic modulus E' at the high-temperature region (200° C.) was only $1.10 \times 10^5$ dyne/cm². Its "tolerance to high temperature" and "high-temperature high-humidity heat cycle durability" were worse than an adhesive prepared from the acrylic-based polymer graft-polymerized and modified with a reactive ethylene/silane coupling agent according to the present invention.

TABLE 1

Adhesive Composition Formula

| Binder | | | Sample 1 | 2 | 3 | 4 | 5 | 6 | 7 | 8 | 9 |
|---|---|---|---|---|---|---|---|---|---|---|---|
| acrylic-based copolymer monomer | alkyl[1] | n-BA | 89.97 | 89.93 | 89.90 | 89.80 | 89.93 | 89.93 | 89.93 | 89.92 | 89.91 |
| | | 2-EHA | 5 | 5 | 5 | 5 | 5 | 5 | 5 | 5 | 5 |
| | hydroxyl[2] | 2-HEA | 4 | 4 | 4 | 4 | 4 | 4 | 4 | 4 | 4 |
| | aromatic ring[3] | BZA | — | — | — | — | — | — | — | — | — |
| | | PHEA | — | — | — | — | — | — | — | — | — |
| | carboxyl[4] | AA | 1 | 1 | 1 | 1 | 1 | 1 | 1 | 1 | 1 |
| | Silane coupling agent[5] | A | 0.03 | 0.07 | 0.1 | 0.2 | — | — | — | 0.04 | 0.03 |
| | | B | — | — | — | — | 0.07 | — | — | 0.04 | 0.03 |
| | | C | — | — | — | — | — | 0.07 | — | — | 0.03 |
| | | D | — | — | — | — | — | — | 0.07 | — | — |
| monomer ratio of benzene ring % | | | — | — | — | — | — | — | — | — | — |
| mixed solvent | ethyl acetate | | — | — | 20 | 20 | 100 | 100 | 100 | 50 | 50 |
| | toluene | | — | — | 30 | 30 | — | — | — | — | — |
| | acetone | | — | — | 25 | 25 | — | — | — | — | — |
| | butanone | | 25 | 25 | 25 | 25 | — | — | — | 50 | 50 |
| silane-containing rate % | | | 0.03 | 0.07 | 0.1 | 0.2 | 0.07 | 0.07 | 0.07 | 0.08 | 0.09 |
| molecular weight (10,000) (MW) | | | 70 | 90 | 110 | 120 | 80 | 110 | 110 | 90 | 100 |

| Binder | | | Sample 10 | 11 | 12 | 13 | 14 | 15 | 16 | 17 |
|---|---|---|---|---|---|---|---|---|---|---|
| acrylic-based copolymer monomer | alkyl[1] | n-BA | 89.84 | 90 | 80 | 80 | 75 | 70 | 60 | 90 |
| | | 2-EHA | 5 | 5 | 5 | 5 | 5 | 5 | 5 | 5 |
| | hydroxyl[2] | 2-HEA | 4 | 4 | 4 | 4 | 4 | 4 | 4 | 4 |
| | aromatic ring[3] | BZA | — | — | 5 | 10 | — | 20 | 30 | — |
| | | PHEA | — | — | 5 | — | 15 | — | — | — |
| | carboxyl[4] | AA | 1 | 1 | 1 | 1 | 1 | 1 | 1 | 1 |
| | Silane coupling agent[5] | A | 0.04 | — | — | — | — | — | — | — |
| | | B | 0.04 | — | — | — | — | — | — | — |
| | | C | 0.04 | — | — | — | — | — | — | — |
| | | D | 0.04 | — | — | — | — | — | — | — |
| monomer ratio of benzene ring % | | | — | — | 10 | 10 | 15 | 20 | 30 | — |
| mixed solvent | ethyl acetate | | 50 | 20 | 20 | 20 | 20 | 20 | 20 | — |
| | toluene | | — | 30 | 30 | 30 | 30 | 30 | 30 | 100 |

TABLE 1-continued

Adhesive Composition Formula

| | | | | | | | | |
|---|---|---|---|---|---|---|---|---|
| acetone | — | 25 | 25 | 25 | 25 | 25 | 25 | — |
| butanone | 50 | 25 | 25 | 25 | 25 | 25 | 25 | — |
| silane-containing rate % | 0.16 | — | — | — | — | — | — | — |
| molecular weight (10,000) (MW) | 120 | 110 | 60 | 85 | 110 | 140 | 160 | 3 |

Remarks:
[1] BA: butyl acrylate; 2-EHA: 2-ethyl hexyl acrylate;
[2] 2-HEA: 2-hydroxyethyl acrylate
[3] BZA: benzyl acrylate; PHEA: 2-phenoxy ethyl acrylate;
[4] AA: acrylic acid;
[5] A: γ-methacryloxypropyltrimethoxysilane; B: vinyltrichlorosilane; C: vinyltrimethoxysilane; and D: vinyltriethoxysilane

TABLE 2

Processing Formula and Results of Evaluation

| | | Processing Formula | | | Results of Evaluation | | | | |
|---|---|---|---|---|---|---|---|---|---|
| | | acrylic-based polymer (A) | cross-linking agent (B) | silane coupling agent | Durability Evaluation | | | Value E' of DMA rheometer ($10^5$ dyn/cm²) | |
| | | | | | | high-temperature, | | | |
| | Sample | part(s) by weight | part(s) by weight | part(s) by weight | tolerance to high temperature | high-humidity heat cycle durability | prevent from light leakage | 150° C. | 200° C. |
| Example 1 | Sample 1 | 100 | 0.2 | — | good | good | excellent | 6.29 | 3.53 |
| Example 2 | Sample 2 | 100 | 0.2 | — | excellent | excellent | excellent | 7.94 | 5.82 |
| Example 3 | Sample 3 | 100 | 0.2 | — | excellent | excellent | excellent | 10.5 | 6.8 |
| Example 4 | Sample 4 | 100 | 0.2 | — | excellent | excellent | good | 11.5 | 8.44 |
| Example 5 | Sample 5 | 100 | 0.2 | — | excellent | excellent | excellent | 8.46 | 6.67 |
| Example 6 | Sample 6 | 100 | 0.2 | — | excellent | excellent | good | 7.75 | 7.22 |
| Example 7 | Sample 7 | 100 | 0.2 | — | excellent | excellent | good | 7.04 | 5.08 |
| Example 8 | Sample 8 | 100 | 0.2 | — | excellent | excellent | excellent | 4.85 | 5.70 |
| Example 9 | Sample 9 | 100 | 0.2 | — | excellent | excellent | excellent | 5.79 | 4.74 |
| Example 10 | Sample 10 | 100 | 0.2 | — | excellent | excellent | good | 3.63 | 2.73 |
| Comparative Example 1 | Sample 11 | 100 | 0.2 | — | poor | bad | poor | 2.75 | 0.86 |
| Comparative Example 2 | Sample 12 | 100 | 0.2 | — | bad | bad | poor | 3.24 | 1.13 |
| Comparative Example 3 | Sample 13 | 100 | 0.2 | 0.1 | good | bad | excellent | 7.04 | 1.30 |
| Comparative Example 4 | Sample 14 | 100 | 0.2 | 0.1 | good | good | good | 2.57 | 0.67 |
| Comparative Example 5 | Sample 15 | 100 | 0.2 | 0.1 | excellent | excellent | poor | 5.37 | 2.23 |
| Comparative Example 6 | Sample 15 | 100 | 0.2 | 0.2 | excellent | excellent | poor | 4.17 | 2.07 |
| Comparative Example 7 | Sample 16 | 100 | 0.2 | 0.3 | excellent | excellent | bad | 4.28 | 1.39 |
| Comparative Example 8 | Sample 17 | 100 | 0.2 | 0.1 | bad | bad | bad | 2.99 | 0.79 |
| Comparative Example 9 | Sample 14 | 70 | 0.2 | 0.1 | good | good | excellent | 2.29 | 1.10 |
| | Sample 17 | 30 | | | | | | | |

What is claimed is:

1. An adhesive composition prepared from 100 parts by weight of a component (A) and 0.01 to 1 part by weight of a component (B), wherein
the component (A) is an acrylic-based polymer graft-polymerized and modified by a reactive silane coupling agent and has a weight-average molecular weight of between 700,000 and 1,200,000, and, according to a total weight of the acrylic-based polymer, the component (A) is synthesized by polymerization of:
  a. 50~98% of alkyl group-containing (meth)acrylic acid;
  b. 1~10% of hydroxyl group-containing (meth)acrylic acid;
  c. 0.1~5% of carboxyl group-containing (meth)acrylic acid; and
  d. 0.01~2% of reactive silane coupling agent; and
the component (B) is a cross-linking agent.

2. The adhesive composition of claim 1, wherein the alkyl group-containing (meth)acrylic acid is one, or a mixture of at least two, selected from the group consisting of methyl (meth)acrylate, ethyl (meth)acrylate, propyl (meth)acrylate, butyl (meth)acrylate, isobutyl (meth)acrylate, 2-ethylhexyl (meth)acrylate, octyl (meth)acrylate, isooctyl (meth)acrylate, lauryl (meth)acrylate, octadecyl (meth)acrylate, cyclohexyl (meth)acrylate, methoxyethyl (meth)acrylate, and ethoxymethyl (meth)acrylate.

3. The adhesive composition of claim 1, wherein the hydroxyl group-containing (meth)acrylic acid is one selected from the group consisting of 2-hydroxyethyl (meth)acrylate, 4-hydroxybutyl (meth)acrylate, chloro-2-hydroxypropyl acrylate, diethylene glycol mono(meth)acrylate, and allyl alcohol.

4. The adhesive composition of claim 1, wherein the carboxyl group-containing (meth)acrylic acid is one selected from the group consisting of acrylic acid, methacrylic acid, itaconic acid, butenoic acid, maleic acid, fumaric acid, and maleic anhydride.

5. The adhesive composition of claim 1, wherein the silane coupling agent is one, or a mixture of at leaste two, selected from the group consisting of y-methacryloxypropyltrimethoxysilane, vinyltrichlorosilane, vinyltrimethoxysilane, vinyltriethoxysilane, and ethylene-containing epoxy silane.

6. The adhesive composition of claim 1, wherein the cross-linking agent is one selected from the group consisting of isocyanate-based compound, epoxy compound, amine compound, metal-chelating compound, and aziridine compound.

7. The adhesive composition of claim 6, wherein the cross-linking agent is in an amount of 0.01 to 0.6 part by weight based on 100 parts by weight of the component (A).

8. The adhesive composition of claim 6, wherein the cross-linking agent is in an amount of 0.05 to 0.5 part by weight based on 100 parts by weight of the component (A).

* * * * *